(12) United States Patent
Tomida et al.

(10) Patent No.: US 9,465,568 B2
(45) Date of Patent: Oct. 11, 2016

(54) PRINTING MANAGEMENT APPARATUS, PRINTING MANAGEMENT METHOD, AND COMPUTER-READABLE MEDIUM

(71) Applicant: FUJI XEROX CO., LTD, Minato-ku, Tokyo (JP)

(72) Inventors: Munenori Tomida, Kanagawa (JP); Yoshitaka Ito, Kanagawa (JP)

(73) Assignee: FUJI XEROX CO., LTD, Kanagawa (JP)

( * ) Notice: Subject to any disclaimer, the term of this patent is extended or adjusted under 35 U.S.C. 154(b) by 0 days.

(21) Appl. No.: 14/323,009

(22) Filed: Jul. 3, 2014

(65) Prior Publication Data

US 2015/0153970 A1    Jun. 4, 2015

(30) Foreign Application Priority Data

Nov. 29, 2013    (JP) .................................. 2013-247656

(51) Int. Cl.
*G06F 15/00*    (2006.01)
*G06F 3/12*    (2006.01)
*G06Q 10/02*    (2012.01)
*G06Q 10/10*    (2012.01)

(52) U.S. Cl.
CPC ............. *G06F 3/126* (2013.01); *G06F 3/1204* (2013.01); *G06F 3/1292* (2013.01); *G06Q 10/02* (2013.01); *G06Q 10/1095* (2013.01)

(58) Field of Classification Search
CPC combination set(s) only.
See application file for complete search history.

(56) References Cited

U.S. PATENT DOCUMENTS

| 2006/0227368 A1* | 10/2006 | Hong ........................... 358/1.15 |
| 2010/0106404 A1* | 4/2010 | Kim ................... G01C 21/3691 701/465 |
| 2013/0063774 A1* | 3/2013 | Nuggehalli et al. ......... 358/1.15 |
| 2015/0070725 A1* | 3/2015 | Monden ...................... 358/1.15 |

FOREIGN PATENT DOCUMENTS

| JP | 2000-172462 A | 6/2000 |
| JP | 2001-113796 A | 4/2001 |
| JP | 2002-014917 A | 1/2002 |

\* cited by examiner

*Primary Examiner* — Helen Q Zong
(74) *Attorney, Agent, or Firm* — Sughrue Mion, PLLC

(57) ABSTRACT

A printing management apparatus includes a storage unit, a confirmation unit, a changing unit, and a processor. The storage unit stores schedule information including a correspondence among a visit schedule for a user to visit a visit destination, a printing schedule of target print data associated with the visit destination, and a printing location for the target print data. The confirmation unit confirms whether or not the visit schedule is to be changed, in accordance with a positional relationship between the visit destination and the user. When the visit schedule is changed, the changing unit changes the printing schedule in accordance with the change. The processor causes the target print data to be printed by using a printer installed in the printing location, in accordance with the printing schedule.

9 Claims, 10 Drawing Sheets

FIG. 2A

<BEFORE CHANGE>

| USER ID | RESERVATION NUMBER | FILE NAME | PRINTING LOCATION NAME | SCHEDULED VISIT DATE | SCHEDULED VISIT TIME | VISIT DESTINATION NAME |
|---|---|---|---|---|---|---|
| USER X | 111111 | DOCUMENT E | STORE A | 03/28/2013 | 10:00 | AA TRADING CO. |
| USER X | 222222 | DOCUMENT F | STORE B | 03/28/2013 | 13:00 | BB REAL-ESTATE AGENT |
| USER X | 333333 | DOCUMENT G | STORE C | 03/28/2013 | 15:00 | CC CONSTRUCTION CO. |

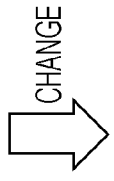
CHANGE

FIG. 2B

<AFTER CHANGE>

| USER ID | RESERVATION NUMBER | FILE NAME | PRINTING LOCATION NAME | SCHEDULED VISIT DATE | SCHEDULED VISIT TIME | VISIT DESTINATION NAME |
|---|---|---|---|---|---|---|
| USER X | 111111 | DOCUMENT E | STORE A | 03/28/2013 | 10:00 | AA TRADING CO. |
| USER X | 444444 | DOCUMENT G | STORE C | 03/28/2013 | 11:00 | CC CONSTRUCTION CO. |
| USER X | 222222 | DOCUMENT F | STORE B | 03/28/2013 | 13:00 | BB REAL-ESTATE AGENT |

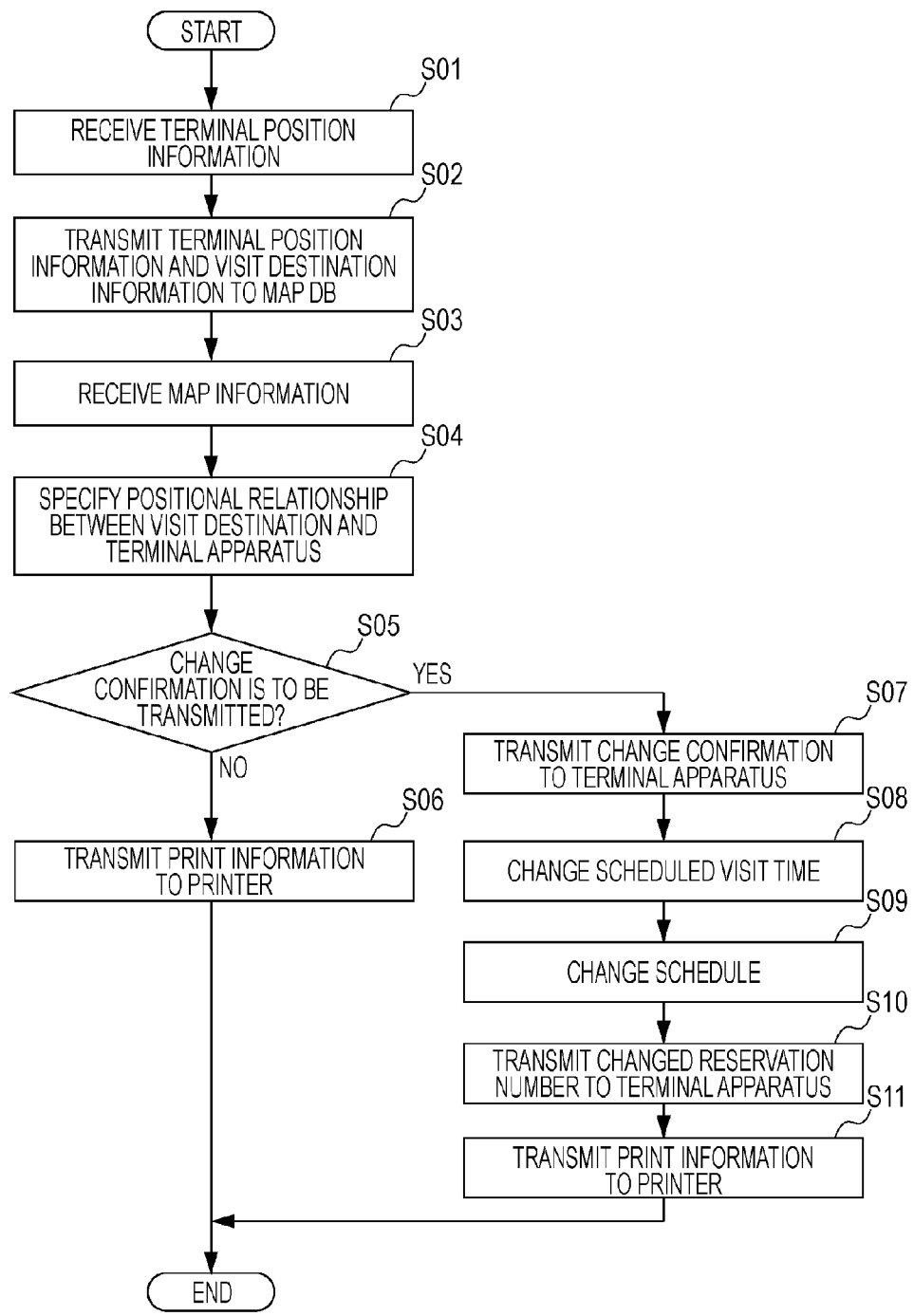

FIG. 6A

<BEFORE CHANGE>

| USER ID | RESERVATION NUMBER | FILE NAME | PRINTING LOCATION NAME | SCHEDULED VISIT DATE | SCHEDULED VISIT TIME | VISIT DESTINATION NAME |
|---|---|---|---|---|---|---|
| USER X | 123456 | DOCUMENT E | STORE A | 03/28/2013 | 10:00 | AA TRADING CO. |
| USER X | 123456 | DOCUMENT F | STORE B | 03/28/2013 | 13:00 | BB REAL-ESTATE AGENT |
| USER X | 123456 | DOCUMENT G | STORE C | 03/28/2013 | 15:00 | CC CONSTRUCTION CO. |

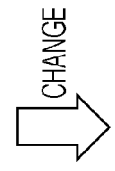
CHANGE

FIG. 6B

<AFTER CHANGE>

| USER ID | RESERVATION NUMBER | FILE NAME | PRINTING LOCATION NAME | SCHEDULED VISIT DATE | SCHEDULED VISIT TIME | VISIT DESTINATION NAME |
|---|---|---|---|---|---|---|
| USER X | 123456 | DOCUMENT E | STORE A | 03/28/2013 | 10:00 | AA TRADING CO. |
| USER X | 123456 | DOCUMENT G | STORE C | 03/28/2013 | 13:00 | CC CONSTRUCTION CO. |
| USER X | 123456 | DOCUMENT F | STORE B | 03/28/2013 | 15:00 | BB REAL-ESTATE AGENT |

FIG. 8A

<BEFORE CHANGE>

| USER ID | RESERVATION NUMBER | TEMPORARY NUMBER | FILE NAME | PRINTING LOCATION NAME | SCHEDULED VISIT DATE | SCHEDULED VISIT TIME | VISIT DESTINATION NAME |
|---|---|---|---|---|---|---|---|
| USER X | 123456 | NULL | DOCUMENT E | STORE A | 03/28/2013 | 10:00 | AA TRADING CO., A1 BRANCH |
| USER Y | 123456 | NULL | DOCUMENT F | STORE B | 03/28/2013 | 13:00 | AA TRADING CO., A2 BRANCH |
| USER Z | 123456 | NULL | DOCUMENT G | STORE B | 03/28/2013 | 15:00 | AA TRADING CO., A2 BRANCH |

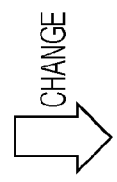
CHANGE

FIG. 8B

<AFTER CHANGE>

| USER ID | RESERVATION NUMBER | TEMPORARY NUMBER | FILE NAME | PRINTING LOCATION NAME | SCHEDULED VISIT DATE | SCHEDULED VISIT TIME | VISIT DESTINATION NAME |
|---|---|---|---|---|---|---|---|
| USER X | 123456 | NULL | DOCUMENT E | STORE A | 03/28/2013 | 10:00 | AA TRADING CO., A1 BRANCH |
| USER Z | 123456 | 987654 | DOCUMENT G | STORE B | 03/28/2013 | 13:00 | AA TRADING CO., A2 BRANCH |
| USER Y | 123456 | NULL | DOCUMENT F | STORE B | 03/28/2013 | 13:00 | AA TRADING CO., A2 BRANCH |

PRINTING MANAGEMENT APPARATUS, PRINTING MANAGEMENT METHOD, AND COMPUTER-READABLE MEDIUM

CROSS-REFERENCE TO RELATED APPLICATIONS

This application is based on and claims priority under 35 USC 119 from Japanese Patent Application No. 2013-247656 filed Nov. 29, 2013.

BACKGROUND (i) Technical Field

The present invention relates to a printing management apparatus, a printing management method, and a computer-readable medium.

(ii) Related Art

A system is known in which target print data is transmitted via a communication path such as a network to a printer, and in which the printer performs printing. For example, when a user is to perform printing while being away from his/her home or office, the user uses such a system.

SUMMARY

According to an aspect of the present invention, there is provided a printing management apparatus including a storage unit, a confirmation unit, a changing unit, and a processor. The storage unit stores schedule information including a correspondence among a visit schedule for a user to visit a visit destination, a printing schedule of target print data associated with the visit destination, and a printing location for the target print data. The confirmation unit confirms whether or not the visit schedule is to be changed, in accordance with a positional relationship between the visit destination and the user. When the visit schedule is changed, the changing unit changes the printing schedule in accordance with the change. The processor causes the target print data to be printed by using a printer installed in the printing location, in accordance with the printing schedule.

BRIEF DESCRIPTION OF THE DRAWINGS

Exemplary embodiments of the present invention will be described in detail based on the following figures, wherein:

FIGS. 2A and 2B are tables showing exemplary schedule information according to a first example;

FIG. 3 is a flowchart of an exemplary process according to the first example;

FIGS. 6A and 6B are tables showing exemplary schedule information according to a second example;

FIGS. 8A and 8B are tables showing exemplary schedule information according to a third example;

DETAILED DESCRIPTION

Figure 1:
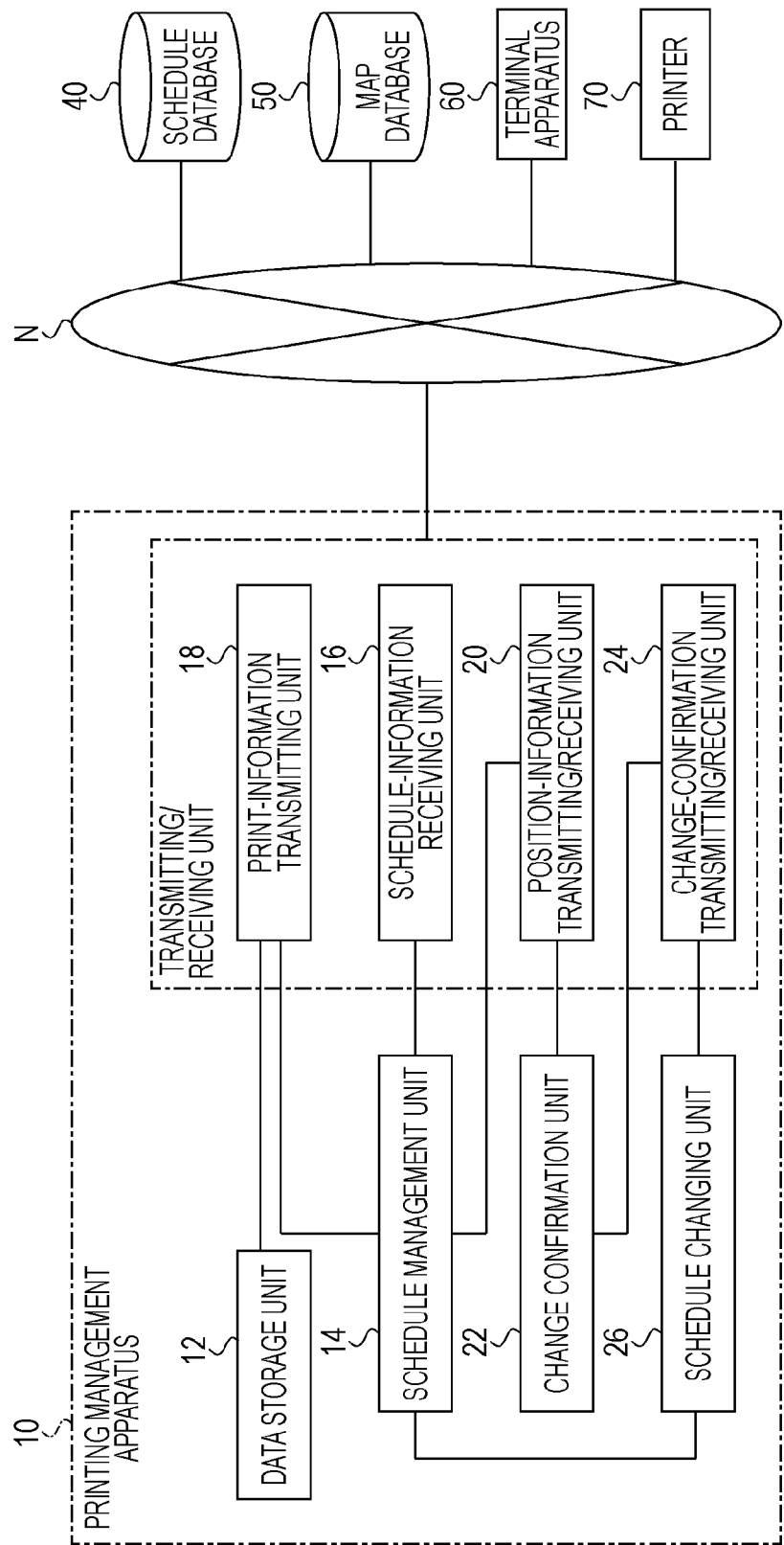
FIG. 1 is a block diagram illustrating an exemplary printing system according to an exemplary embodiment of the present invention.

FIG. 1 illustrates an exemplary printing system according to an exemplary embodiment of the present invention. The printing system according to the present exemplary embodiment includes a printing management apparatus 10, a schedule database (schedule DB) 40, a map database (map DB) 50, a terminal apparatus 60, and a printer 70, which are connected to each other via a communication path N such as a network. In FIG. 1, only one terminal apparatus 60 and one printer 70 are illustrated. However, the number of terminal apparatuses 60 may be more than one, and the number of printers 70 may be more than one.

The printing management apparatus 10 manages a schedule for printing data which is to be printed (hereinafter, referred to as "target print data"), and transmits the target print data to the printer 70 in accordance with the schedule.

The schedule DB 40 stores visit schedule information concerning a visit schedule for a user to visit destinations. The visit schedule information includes a correspondence, for example, among a visit destination, a scheduled time for a user to visit the visit destination (hereinafter, referred to as a "scheduled visit time"), and user identification information for identifying the user who is scheduled to visit the visit destination. The visit schedule information is, for example, information generated in advance by a user by using the terminal apparatus 60 or another apparatus. The schedule DB 40 has a transmitting/receiving unit (network interface), and transmits schedule information to the printing management apparatus 10 in response to a request for obtaining visit schedule information.

The map DB 50 stores map information. The map DB 50 has a transmitting/receiving unit (network interface), and transmits map information to the printing management apparatus 10 in response to a request for obtaining map information.

The terminal apparatus 60 is a portable terminal apparatus, such as a so-called smart phone or a cellular phone. For example, the terminal apparatus 60 is carried by a user when the user visits a visit destination. The terminal apparatus 60 has a transmitting/receiving unit (network interface), and receives/transmits information from/to the printing management apparatus 10. The terminal apparatus 60, which also has a function of detecting a position, such as a global positioning system (GPS), obtains position information (terminal position information) of the terminal apparatus 60 itself, and transmits the terminal position information to the printing management apparatus 10.

The printer 70 has a transmitting/receiving unit (network interface) and a printing unit, and receives target print data from the printing management apparatus 10 to print it. For example, when a user inputs a reservation number described below to the printer 70, the printer 70 prints target print data. The printer 70 may delete target print data which has been printed, from the printer 70. The printer 70 is installed, for example, in a store, such as a convenience store or a supermarket.

The printing management apparatus 10 will be described in detail. The printing management apparatus 10 includes a data storage unit 12, a schedule management unit 14, a transmitting/receiving unit, a change confirmation unit 22, and a schedule changing unit 26. The transmitting/receiving unit includes a schedule-information receiving unit 16, a print-information transmitting unit 18, a position-information transmitting/receiving unit 20, and a change-confirmation transmitting/receiving unit 24.

The data storage unit 12 stores print information. The print information includes target print data which is scheduled to be printed by the printer 70, and information concerning printing conditions of the target print data. The print information is transmitted, for example, from an external apparatus to the printing management apparatus 10, and is stored in the data storage unit 12.

The schedule management unit 14 stores schedule information including a correspondence among a schedule for a user to visit a visit destination, a schedule for printing the target print data associated with the visit destination, and a location where the target print data is to be printed. Target print data associated with a visit destination is, for example, document data used by a user at a visit destination.

FIGS. 2A and 2B illustrate exemplary schedule information. For example, as illustrated in FIG. 2A, the schedule information includes a correspondence among a user ID, a reservation number, a file name, a printing location name, a scheduled visit date, a scheduled visit time, and a visit destination name. The user ID is user identification information for identifying a user who is scheduled to visit the visit destination. The reservation number is a number for printing target print data by using the printer 70. For example, when the target print data is registered in the printing management apparatus 10, the schedule management unit 14 associates the reservation number with the target print data. When the user registers the target print data in the printing management apparatus 10 by using the terminal apparatus 60 or another apparatus, the reservation number is transmitted from the printing management apparatus 10 to the terminal apparatus 60 or another apparatus. When the reservation number is input to the printer 70, the target print data corresponding to the reservation number is printed. The file name is the name of the target print data. The printing location name is the name of a location where the printer 70 is installed. For example, the printing location is specified by the user. For example, when the target print data is to be registered in the printing management apparatus 10, the user uses the terminal apparatus 60 or another apparatus to specify the printing location. The scheduled visit date is a scheduled date when the user is scheduled to visit the visit destination. The scheduled visit time is a scheduled time when the user visits the visit destination. The visit destination name is the name of the visit destination which the user is scheduled to visit. A scheduled visit date, a scheduled visit time, and a visit destination name correspond to a visit schedule.

The schedule information is generated in advance and is stored in the schedule management unit 14. For example, when target print data is to be registered in the printing management apparatus 10, a user may use the terminal apparatus 60 or another apparatus to specify a printing location and to input visit schedule information (a scheduled visit date, a scheduled visit time, and a visit destination name) so that the printing location and the visit schedule are registered in the schedule management unit 14. Alternatively, the schedule-information receiving unit 16 may receive visit schedule information from the schedule DB 40, and the schedule management unit 14 may use the received visit schedule information to generate schedule information including the reservation number, the file name, and the printing location name.

In accordance with the scheduled visit time included in the schedule information, the print-information transmitting unit 18 transmits print information (information including target print data and printing conditions) to the printer 70 installed in the corresponding printing location. For example, the print-information transmitting unit 18 transmits print information to the printer 70 at a time earlier than the scheduled visit time (before a predetermined time). Thus, the print information is transmitted to the printer 70 in accordance with the scheduled visit time. Therefore, the scheduled visit time may indicate the printing schedule of the target print data. Address information including addresses of printers 70 is stored in the printing management apparatus 10. The print-information transmitting unit 18 may use the address information to transmit print information to the printer 70. The schedule information may include a scheduled printing time, instead of a scheduled visit time, in order to achieve time management. In this case, the print-information transmitting unit 18 transmits print information to the printer 70 in accordance with the scheduled printing time included in the schedule information.

The position-information transmitting/receiving unit 20 receives terminal position information from the terminal apparatus 60. The position-information transmitting/receiving unit 20 also obtains visit destination information concerning a visit destination, from the schedule management unit 14. The position-information transmitting/receiving unit 20 transmits the terminal position information and the visit destination information to the map DB 50, and receives terminal map information including the current position of the terminal apparatus 60 on a map and visit destination map information including the position of the visit destination on the map, from the map DB 50. For example, the position-information transmitting/receiving unit 20 transmits the visit destination name to the map DB 50, and receives visit destination position information concerning the position of the visit destination from the map DB 50. The position-information transmitting/receiving unit 20 outputs the terminal map information and the visit destination map information to the change confirmation unit 22.

The change confirmation unit 22 checks if an inquiry about whether or not the visit schedule is to be changed is to be transmitted to the terminal apparatus 60, in accordance with the relationship between the position of each of the visit destinations included in the schedule information and the current position of the terminal apparatus 60 (user). Specifically, the change confirmation unit 22 uses visit destination map information of each of the visit destinations and the terminal map information to specify the positional relationship between each of the visit destinations and the terminal apparatus 60. In the case where the terminal apparatus 60 is closest to a visit destination which has not been visited and which is other than the next visit destination (visit destination candidate), the change confirmation unit 22 causes an inquiry about whether or not the visit schedule is to be changed, to be transmitted to the terminal apparatus 60.

The change-confirmation transmitting/receiving unit 24 transmits change confirmation information for confirming whether or not the visit schedule is to be changed, to the terminal apparatus 60. The change-confirmation transmitting/receiving unit 24 also receives response information which includes information indicating whether or not the visit schedule is to be changed and which also includes a changed visit schedule if the visit schedule is to be changed, from the terminal apparatus 60, and outputs the response information to the schedule changing unit 26. For example, when a user uses the terminal apparatus 60 to input a scheduled visit time which is one after the visit schedule is changed, the response information including the changed scheduled visit time is transmitted from the terminal apparatus 60 to the printing management apparatus 10.

When a user changes a scheduled visit time, the schedule changing unit 26 changes the visit schedule and the printing schedule included in the schedule information. Specifically, the schedule changing unit 26 changes the scheduled visit time included in the schedule information to the changed scheduled visit time. Thus, the target print data is transmitted to the printer 70 in accordance with the changed scheduled visit time.

Specific examples of the printing management apparatus 10 will be described below.

First Example

A first example will be described with reference to FIGS. 2A to 5. Schedule information according to the first example will be described. FIG. 2A illustrates a schedule which has not been changed. In the first example, a user X carries the terminal apparatus 60, and is scheduled to visit "AA Trading Co.", "BB Real-Estate Agent", and "CC Construction Co." in this order. The user X is also scheduled to print target print data of "document E" at "Store A", print target print data of "document F" at "Store B", and print target print data of "document G" at "Store C". In the first example, a reservation number is associated with each of the pieces of target print data. Specifically, the target print data of "document E" is associated with a reservation number "111111", and the target print data of "document F" is associated with a reservation number "222222". For example, when the user X inputs the reservation number "111111" to the printer 70 installed in "Store A", the printer 70 installed in "Store A" prints the target print data of "document E" corresponding to the reservation number "111111". An operation similar to that on "document E" is performed on "document F" and "document G". When the user X inputs a reservation number to the printer 70 installed in a store, the target print data of the corresponding document is printed.

With reference to the flowchart in FIG. 3, the process according to the first example will be described. The position-information transmitting/receiving unit 20 receives terminal position information from the terminal apparatus 60 (in step S01), and transmits the terminal position information and visit destination information to the map DB 50 (in step S02). In the example in FIG. 2A, "AA Trading Co.", "BB Real-Estate Agent", and "CC Construction Co." are registered as visit destinations. Therefore, the position-information transmitting/receiving unit 20 transmits the pieces of visit destination information, each of which indicates a corresponding one of "AA Trading Co.", "BB Real-Estate Agent", and "CC Construction Co.", to the map DB 50. The position-information transmitting/receiving unit 20 receives terminal map information including the current position of the terminal apparatus 60 and visit destination map information including the position of each of the visit destinations, from the map DB 50 (in step S03).

The change confirmation unit 22 uses the visit destination map information of each of the visit destinations and the terminal map information to specify the positional relationship between each of the visit destinations and the terminal apparatus 60 (in step S04). In the case where the terminal apparatus 60 is closest to a visit destination which has not been visited and which is other than the visit destination candidate which is the next visit destination, the change confirmation unit 22 causes an inquiry about whether or not the visit schedule is to be changed, to be transmitted to the terminal apparatus 60.

The process performed by the change confirmation unit 22 will be described with reference to FIGS. 2A, 2B, 4, and 5. For example, the current time is "10:30". As illustrated in FIG. 2A, the scheduled visit time to visit "AA Trading Co." is "10:00"; the scheduled visit time to visit "BB Real-Estate Agent" is "13:00"; and the scheduled visit time to visit "CC Construction Co." is "15:00". In the first example, "AA Trading Co." has been visited, and the target print data of "document E" has been printed. According to the scheduled visit times to visit "BB Real-Estate Agent" and "CC Construction Co.", the next visit destination (visit destination candidate) is "BB Real-Estate Agent".

Figure 4:
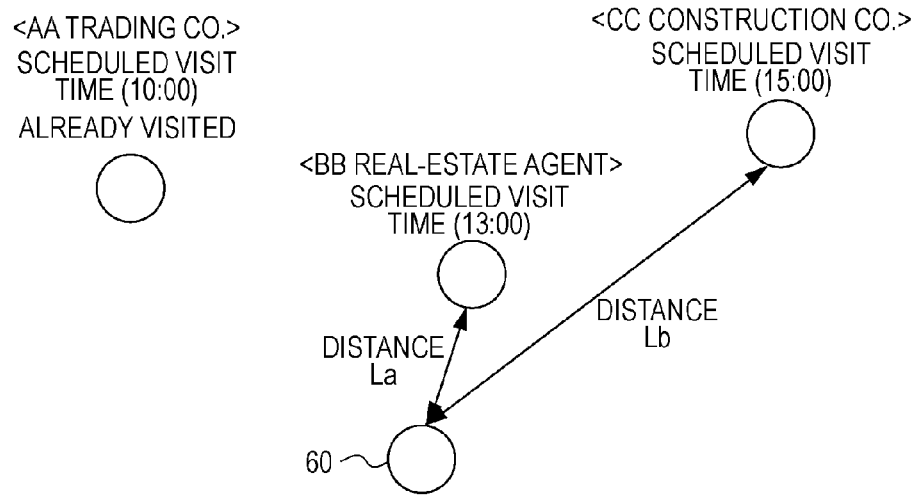
FIG. 4 is a schematic diagram illustrating an exemplary positional relationship between a terminal apparatus and visit destinations.
Figure 5:
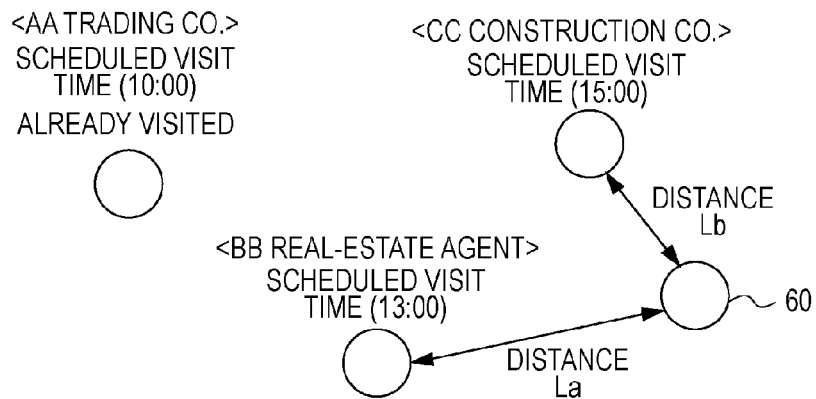
FIG. 5 is a schematic diagram illustrating an exemplary positional relationship between a terminal apparatus and visit destinations.

In FIGS. 4 and 5, the positional relationship between the terminal apparatus 60 and each of the visit destinations at "10:30" is illustrated. The change confirmation unit 22 uses the visit destination map information of each of the visit destinations and the terminal map information to specify the positional relationship between the terminal apparatus 60 and each of "AA Trading Co.", "BB Real-Estate Agent", and "CC Construction Co." The change confirmation unit 22 obtains the distance La between the terminal apparatus 60 and "BB Real-Estate Agent" which is the next visit destination (visit destination candidate), and further obtains the distance Lb between the terminal apparatus 60 and "CC Construction Co." which is another destination which has not been visited. The distances La and Lb may be a straight-line distance, or may be a distance along a path between the terminal apparatus 60 and each of the visit destinations.

As illustrated in FIG. 4, when the distance La is equal to or smaller than the distance Lb (La≤Lb), the change confirmation unit 22 does not cause an inquiry about whether or not the visit schedule is to be changed, to be transmitted. In contrast, as illustrated in FIG. 5, when the distance La is longer than the distance Lb (La>Lb), the change confirmation unit 22 causes an inquiry about whether or not the visit schedule is to be changed, to be transmitted. That is, when the visit schedule has not been changed, the next visit destination is "BB Real-Estate Agent". Therefore, as illustrated in FIG. 4, a user should be present at a position closer to "BB Real-Estate Agent" than "CC Construction Co." In this case, there is a probability that the visits will be made according to the visit schedule. Therefore, the change confirmation unit 22 does not cause the inquiry to be transmitted. In contrast, as illustrated in FIG. 5, when a user is present at a position closer to "CC Construction Co." than "BB Real-Estate Agent", there is a probability that the user has changed the visit schedule and that the user is going to visit "CC Construction Co." prior to "BB Real-Estate Agent". In this case, the schedule of the user may have been changed. Therefore, the change confirmation unit 22 causes the inquiry to be transmitted. Thus, determination is made as to whether or not an inquiry about whether or not the visit schedule is to be changed is to be transmitted, by using the positional relationship between the user (terminal apparatus 60) and each of the visit destinations.

Returning back to FIG. 3, if whether or not the visit schedule is to be changed is not to be confirmed, that is, if the distance La≤the distance Lb (NO in step S05), the print-information transmitting unit 18 transmits the print information in accordance with the scheduled visit time included in the schedule information, to the printer 70 installed in the corresponding printing location (in step S06).

In the example illustrated in FIG. 2A, the print-information transmitting unit 18 transmits the print information (target print data and information concerning printing conditions) of "document F" to the printer 70 installed in "Store B", at a time earlier than the scheduled visit time "13:00" to visit the next visit destination "BB Real-Estate Agent" (before the predetermined time). Thus, "document F" enters the printing waiting state. For example, the print-information transmitting unit 18 transmits the print information of "document F" to the printer 70 installed in "Store B", 30 minutes earlier than the scheduled visit time "13:00".

When the user X arrives at "Store B" and inputs the reservation number "222222" to the printer 70 installed in "Store B", the printer 70 prints the target print data of "document F". After the printing, the printer 70 deletes the target print data of "document F" which has been printed, from the printer 70, and transmits information indicating that "document F" has been printed, to the printing management apparatus 10.

If whether or not the visit schedule is to be changed is to be confirmed, that is, the distance La>the distance Lb (YES in step S05), the change-confirmation transmitting/receiving unit 24 transmits change confirmation information for confirming whether or not the visit schedule is to be changed, to the terminal apparatus 60 (in step S07). The user X uses the terminal apparatus 60 to change the scheduled visit time (in step S08). For example, as illustrated in FIG. 2B, the user X changes the scheduled visit time to visit "CC Construction Co." from "15:00" to "11:00". The terminal apparatus 60 transmits response information including the changed scheduled visit time to the printing management apparatus 10.

The change-confirmation transmitting/receiving unit 24 receives the response information from the terminal apparatus 60, and outputs the response information to the schedule changing unit 26. The schedule changing unit 26 changes the scheduled visit time included in the schedule information in accordance with the changed scheduled visit time included in the response information (in step S09). For example, as illustrated in FIG. 2B, the schedule changing unit 26 changes the scheduled visit time to visit "CC Construction Co." to "11:00", and moves up the order of the visit. Thus, the next visit destination (visit destination candidate) is changed from "BB Real-Estate Agent" to "CC Construction Co."

When the visit schedule is not changed, the user X uses the terminal apparatus 60 to respond that the scheduled visit time is not changed. In this case, the response information indicating the response is transmitted from the terminal apparatus 60 to the printing management apparatus 10, and the visit schedule remains unchanged.

The schedule changing unit 26 changes the reservation number of the target print data associated with the visit destination for which the scheduled visit time has been changed, and the change-confirmation transmitting/receiving unit 24 transmits the changed reservation number to the terminal apparatus 60 (in step S10). In the example in FIG. 2B, the schedule changing unit 26 changes the reservation number of "document G" associated with "CC Construction Co." from "333333" to "444444". The change-confirmation transmitting/receiving unit 24 transmits the changed reservation number "444444" to the terminal apparatus 60.

In accordance with the scheduled visit time included in the changed schedule information, the print-information transmitting unit 18 transmits the print information to the printer 70 installed in the corresponding printing location (in step S11). In the example in FIG. 2B, the print-information transmitting unit 18 transmits the print information of "document G" to the printer 70 installed in "Store C", at a time earlier than the scheduled visit time "11:00" to visit the next visit destination "CC Construction Co." (for example, 30 minutes early).

When the user X arrives at "Store C" and inputs the reservation number "444444" to the printer 70 installed in "Store C", the printer 70 prints the target print data of "document G". After the printing, the printer 70 deletes the target print data of "document G" which has been printed, from the printer 70, and transmits information indicating that "document G" has been printed, to the printing management apparatus 10.

As described above, when the visit schedule for visiting a visit destination candidate is changed, the printing schedule for the target print data associated with the visit destination candidate is changed. Therefore, the target print data is transmitted to the printer 70 in accordance with the user schedule and is printed. Thus, even when the user changes his/her schedule, a decrease in security of the target print data is prevented or reduced, and a decrease in usability is prevented or reduced. In accordance with a user action, an inquiry about whether or not the visit schedule is to be changed is automatically transmitted from the printing management apparatus 10 to the terminal apparatus 60. Therefore, the user's time and effort which are required to change the visit schedule (print schedule) are reduced. For example, even when a user suddenly changes his/her schedule, an inquiry about whether or not the visit schedule is to be changed is automatically transmitted, and the printing schedule is changed in accordance with the sudden schedule change, preventing or reducing a decrease in usability.

If a change of the visit schedule does not cause the printing schedule to be changed, when a user arrives at the printer 70, the target print data has sometimes not been transmitted to the printer 70. In this case, while the printer 70 is receiving the target print data, the user has to wait, reducing the usability. When the printer 70 has received the target print data before the user arrives at the printer 70, the printer 70 stores the target print data for a longer time period, as the time period from a time point when the transmission is completed to a time point when the user arrives at the printer 70 becomes longer. Therefore, security of the target print data is reduced. In the present exemplary embodiment, when the visit schedule is changed, the schedule for transmitting the target print data to the printer 70 is changed, preventing or reducing a decrease in security of the target print data and in usability.

In the case where the target print data stored in the printer 70 has not been printed even when the scheduled visit time comes, that is, in the case where the information indicating completion of printing has not been transmitted from the printer 70 to the printing management apparatus 10, the printing management apparatus 10 may transmit information for confirming continuation of the printing to the terminal apparatus 60 of the user. For example, if the target print data of "document E" has not been printed even when the scheduled visit time "10:00" comes, the printing management apparatus 10 transmits information for confirming whether or not the target print data of "document E" stored in the printer 70 in "Store A" is to be deleted, to the terminal apparatus 60 of the user X. After the user X gives a "delete" instruction by using the terminal apparatus 60, when information indicating the instruction is transmitted from the terminal apparatus 60 to the printing management apparatus 10, the printing management apparatus 10 controls the printer 70 so that the target print data of "document E" is deleted. Thus, the printer 70 deletes the target print data of "document E" which has not been printed. When the user X does not give a "delete" instruction, the printer 70 continuously stores the target print data of "document E".

If the target print data has not been printed even when the scheduled visit time comes, the target print data is deleted from the printer 70, preventing or reducing a decrease in security of the target print data. That is, as long as the printing is not completed, the printer 70 continuously stores the target print data. Therefore, security of the target print data may be decreased. When the printing has not been performed in accordance with the schedule, the target print data is deleted from the printer 70, preventing or reducing a decrease in security.

Second Example

Figure 7:
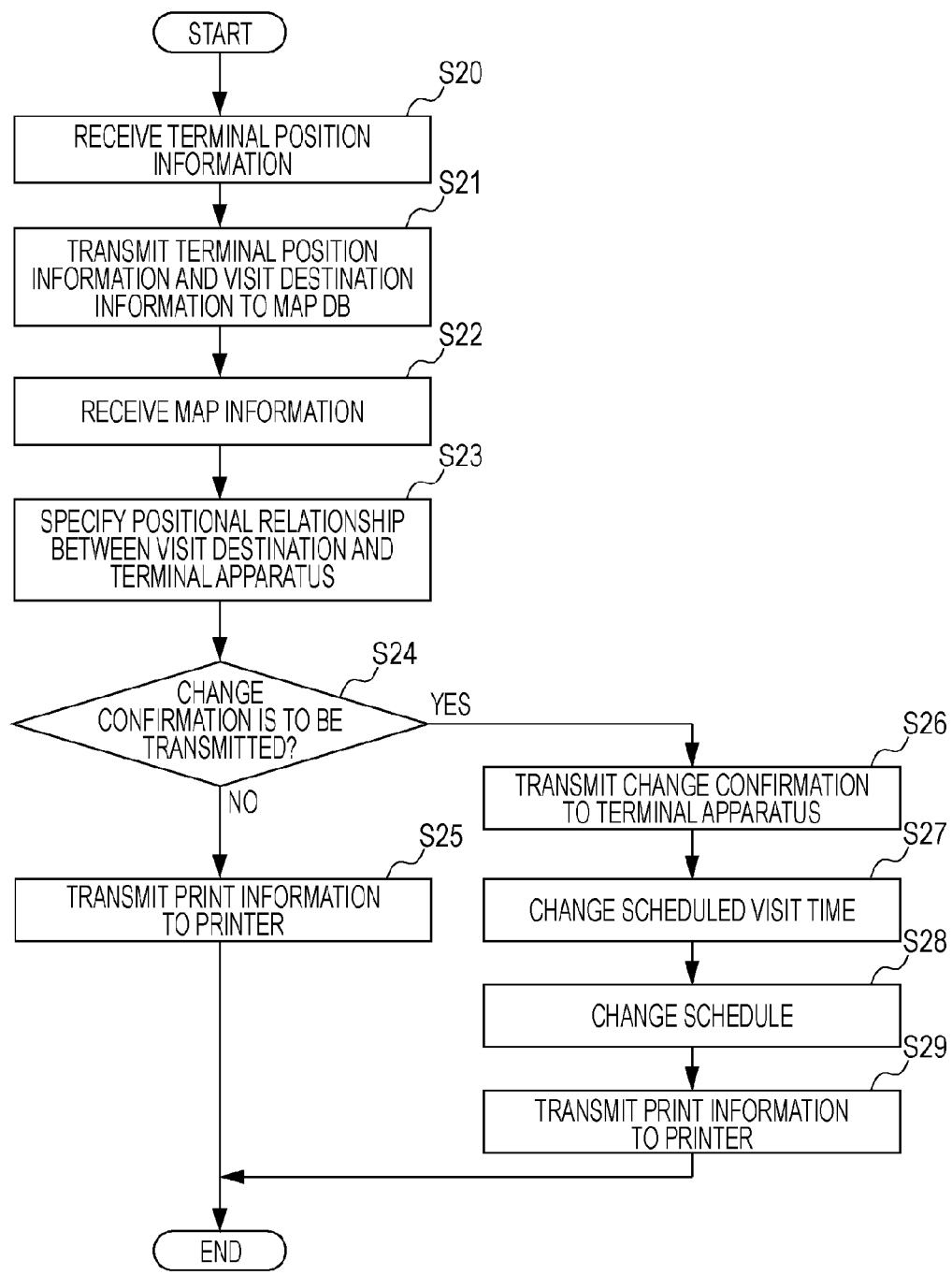
FIG. 7 is a flowchart of an exemplary process according to the second example.

A second example will be described with reference to FIGS. 6A to 7.

The schedule information according to the second example will be described. FIG. 6A illustrates a schedule which has not been changed. The schedule which has not been changed in the second example is the same as the schedule which has not been changed in the first example, in which the user X carries the terminal apparatus 60 and is scheduled to visit "AA Trading Co.", "BB Real-Estate Agent", and "CC Construction Co." in this order.

In the second example, each of the users is associated with a reservation number. Specifically, the user X is associated with a reservation number "123456". For example, when the user X inputs the reservation number "123456" to the printer 70 installed in "Store A", the printer 70 installed in "Store A" prints the target print data of "document E" corresponding to the reservation number "123456" and the printing location name "Store A". Similarly, when the user X inputs the reservation number "123456" to the printer 70 installed in "Store B", the printer 70 installed in "Store B" prints the target print data of "document F" corresponding to the reservation number "123456" and the printing location name "Store B".

The process according to the second example will be described with reference to the flowchart in FIG. 7. The current time is "10:30", "AA Trading Co." has been visited, and the target print data of "document E" has been printed.

The position-information transmitting/receiving unit 20 receives the terminal position information from the terminal apparatus 60 (in step S20), and transmits the terminal position information and the visit destination information to the map DB 50 (in step S21). The position-information transmitting/receiving unit 20 receives the terminal map information including the current position of the terminal apparatus 60 and the visit destination map information including the position of each of the visit destinations from the map DB 50 (in step S22).

The change confirmation unit 22 uses the visit destination map information of each of the visit destinations and the terminal map information to specify the positional relationship between the terminal apparatus 60 and each of the visit destinations (in step S23). Similarly to the first example, in the case where the terminal apparatus 60 is closest to a visit destination which has not been visited and which is other than the next visit destination, the change confirmation unit 22 causes an inquiry about whether or not the visit schedule is to be changed, to be transmitted to the terminal apparatus 60.

If whether or not the visit schedule is to be changed is not to be confirmed (NO in step S24), the print-information transmitting unit 18 transmits the print information in accordance with the scheduled visit time included in the schedule information, to the printer 70 installed in the corresponding printing location (in step S25). In the example illustrated in FIG. 6A, the print-information transmitting unit 18 transmits the print information of "document F" to the printer 70 installed in "Store B", at a time earlier than the scheduled visit time "13:00" to visit the next visit destination "BB Real-Estate Agent" (for example, 30 minutes early).

When the user X arrives at "Store B" and inputs the reservation number "123456" to the printer 70 installed in "Store B", the printer 70 prints the target print data of "document F". After the printing, the printer 70 deletes the target print data of "document F" which has been printed, from the printer 70, and transmits information indicating that "document F" has been printed, to the printing management apparatus 10.

If whether or not the visit schedule is to be changed is to be confirmed (YES in step S24), the change-confirmation transmitting/receiving unit 24 transmits change confirmation information for confirming whether or not the visit schedule is to be changed, to the terminal apparatus 60 (in step S26). The user X uses the terminal apparatus 60 to change the scheduled visit time (in step S27). For example, as illustrated in FIG. 6B, the user X changes the scheduled visit time to visit "CC Construction Co." from "15:00" to "13:00", and changes the scheduled visit time to visit "BB Real-Estate Agent" from "13:00" to "15:00". The terminal apparatus 60 transmits response information including the changed scheduled visit times to the printing management apparatus 10.

The change-confirmation transmitting/receiving unit 24 receives the response information from the terminal apparatus 60, and outputs the response information to the schedule changing unit 26. The schedule changing unit 26 changes the scheduled visit time included in the schedule information in accordance with the changed scheduled visit time included in the response information (in step S28). For example, as illustrated in FIG. 6B, the schedule changing unit 26 changes the scheduled visit time to visit "CC Construction Co." from "15:00" to "13:00", and changes the scheduled visit time to visit "BB Real-Estate Agent" from "13:00" to "15:00". Thus, the next visit destination (visit destination candidate) is changed from "BB Real-Estate Agent" to "CC Construction Co."

In accordance with the scheduled visit time included in the changed schedule information, the print-information transmitting unit 18 transmits the print information to the printer 70 installed in the corresponding printing location (in step S29). In the example in FIG. 6B, the print-information transmitting unit 18 transmits the print information of "document G" to the printer 70 installed in "Store C", at a time earlier than the scheduled visit time "13:00" to visit the next visit destination "CC Construction Co." (for example, 30 minutes early).

When the user X arrives at "Store C" and inputs the reservation number "123456" to the printer 70 installed in "Store C", the printer 70 prints the target print data of "document G". After the printing, the printer 70 deletes the target print data of "document G" which has been printed, from the printer 70, and transmits information indicating that "document G" has been printed, to the printing management apparatus 10.

According to the second example, similarly to the first example, the printing schedule is changed in accordance with the user schedule, preventing or reducing a decrease in security of the target print data and in usability. Each of the users is given a reservation number, achieving easy management of reservation numbers compared with the case in which each of pieces of target print data is given a reservation number. For example, even when pieces of target print data are to be printed, a user manages only the reservation number given to the user because each of the users is given a reservation number, achieving easy management of reservation numbers. Similarly to the first example, the target print data which has not been printed even when the scheduled visit time comes may be deleted from the printer 70.

Third Example

Figure 9:
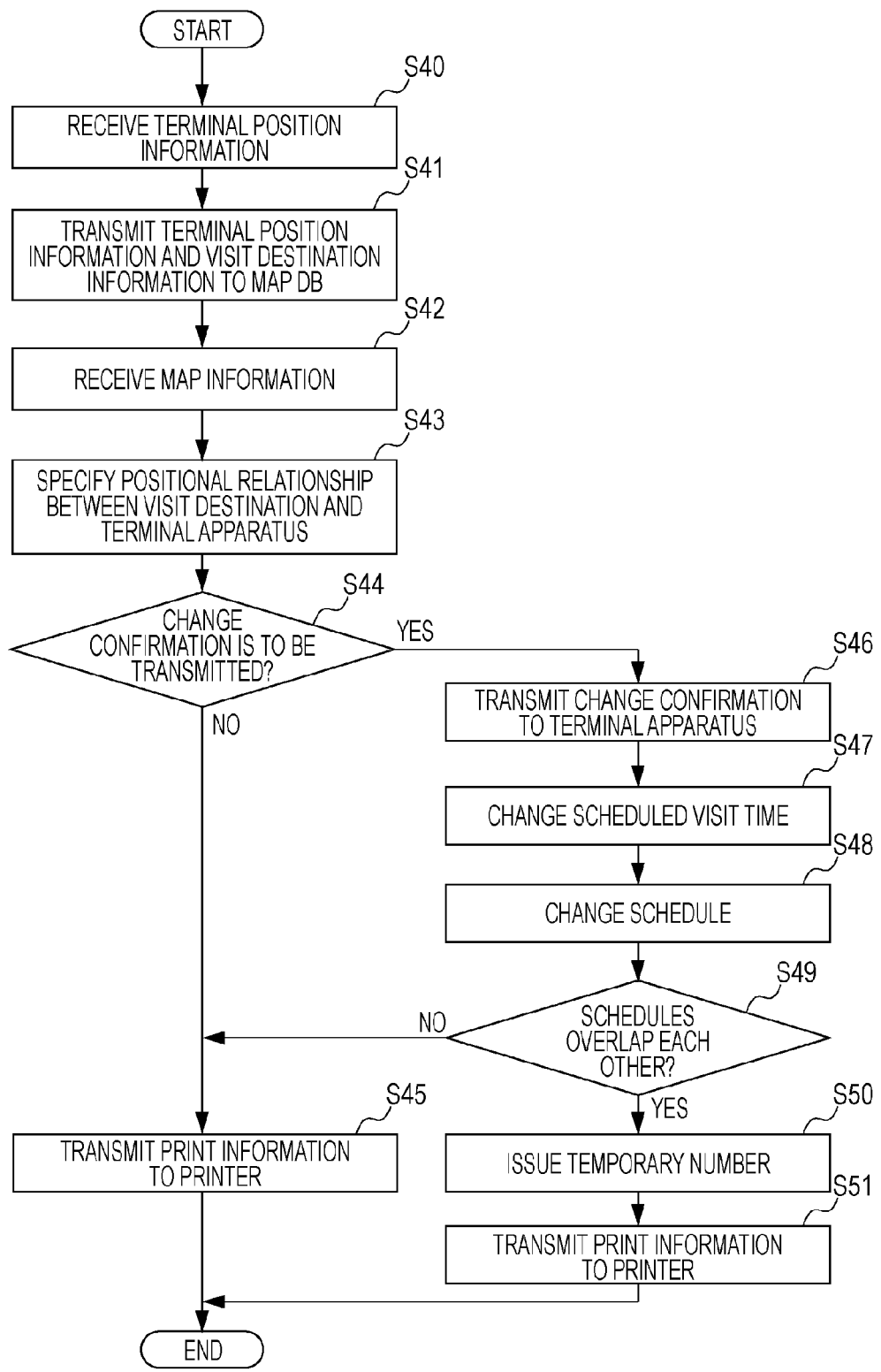
FIG. 9 is a flowchart of an exemplary process according to the third example.

A third example will be described with reference to FIGS. 8A to 9.

The schedule information according to the third example will be described. FIG. 8A illustrates a schedule which has not been changed. In the third example, the user X is scheduled to visit "AA Trading Co., A1 Branch" at "10:00"; a user Y is scheduled to visit "AA Trading Co., A2 Branch" at "13:00"; and a user Z is scheduled to visit "AA Trading Co., A2 Branch" at "15:00". The target print data of "document E" is scheduled to be printed at "Store A"; the target print data of "document F", at "Store B"; and the target print data of "document G", at "Store B".

In the third example, each of the customers is associated with a reservation number. Specifically, "AA Trading Co." is associated with the reservation number "123456". For example, when the user X inputs the reservation number "123456" to the printer 70 installed in "Store A", the printer 70 installed in "Store A" prints the target print data of "document E".

As described above, since each of the customers is given a reservation number, when each of pieces of target print data is associated with the same customer to be visited, each of the pieces of target print data is associated with the same reservation number. Under this condition, when the printing locations (stores) for pieces of target print data are the same, each of the pieces of target print data fails to be differentiated from each other only by using a reservation number. For example, in the case of "document F" and "document G", the customers for the visit destinations associated with "document F" and "document G" are the same. Therefore, both of the documents are associated with the same reservation number "123456". The printing locations for "document F" and "document G" are the same store, "Store B". Therefore, the target print data of both of the documents is transmitted to the printer 70 in the same store, "Store B". Accordingly, "document F" and "document G" are not differentiated from each other only by using the reservation number.

In contrast, the scheduled visit time associated with "document F" is "13:00", and the scheduled visit time associated with "document G" is "15:00". Therefore, "document F" and "document G" are transmitted to the printer 70 in "Store B" at different times. That is, the target print data of "document F" is transmitted to the printer 70 in "Store B" at a time earlier than "13:00" (for example, 12:30), and the target print data of "document G" is transmitted to the printer 70 in "Store B" at a time earlier than "15:00" (for example, 14:30). When the printing is performed in accordance with the schedule, the target print data of "document F" is printed at a time earlier than the scheduled visit time and is deleted from the printer 70. When the target print data of "document G" is to be printed, the target print data of "document F" is not stored in the printer 70. Therefore, after the target print data of "document G" is stored in the printer 70, when the user Z inputs the reservation number "123456" to the printer 70 in "Store B", the printer 70 prints the target print data of "document G". Thus, under the condition that each of the customers is given a reservation number, even in the case where the customers for the visit destinations associated with "document F" and "document G" are the same customer, "AA Trading Co.", and where the printing locations associated with "document F" and "document G" are the same store, "Store B", if the scheduled visit times associated with "document F" and "document G" are different from each other, "document F" and "document G" are differentiated from each other and are printed.

The process according to the third example, which also includes a case in which a visit schedule is changed, will be described with reference to the flowchart in FIG. 9. The current time is "10:30", the user X has visited "AA Trading Co., A1 Branch", and the target print data of "document E" has been printed.

The position-information transmitting/receiving unit 20 receives the terminal position information from the terminal apparatus 60 (in step S40), and transmits the terminal position information and the visit destination information to the map DB 50 (in step S41). The position-information transmitting/receiving unit 20 receives the terminal map information including the current position of the terminal apparatus 60 and the visit destination map information including the position of each of the visit destinations from the map DB 50 (in step S42). In the third example, the position-information transmitting/receiving unit 20 receives the terminal position information from the terminal apparatus 60 of each of the users X, Y, and Z, and receives the terminal map information including the current position of the terminal apparatus 60 of each of the users, from the map DB 50.

The change confirmation unit 22 uses the visit destination map information of each of the visit destinations and the terminal map information of each of the users to specify the positional relationship between the terminal apparatus 60 of each of the users and each of the visit destinations (in step S43). Similarly to the first example, in the case where a terminal apparatus 60 is closest to a visit destination which has not been visited and which is other than the next visit destination, the change confirmation unit 22 causes an inquiry about whether or not the visit schedule is to be changed, to be transmitted to the terminal apparatus 60 of each of the users.

If whether or not the visit schedule is to be changed is not to be confirmed (NO in step S44), the print-information transmitting unit 18 transmits the print information in accordance with the scheduled visit time included in the schedule information, to the printer 70 installed in the corresponding printing location (in step S45).

In the example illustrated in FIG. 8A, the print-information transmitting unit 18 transmits the print information of "document F" to the printer 70 installed in "Store B", at a time earlier than the scheduled visit time "13:00" to visit the visit destination "AA Trading Co., A2 Branch" (for example, 12:30). When the user Y inputs the reservation number "123456" to the printer 70 installed in "Store B", the printer 70 prints the target print data of "document F". After the printing, the printer 70 deletes the target print data of "document F" which has been printed, from the printer 70, and transmits information indicating that "document F" has been printed, to the printing management apparatus 10.

The print-information transmitting unit 18 transmits the print information of "document G" to the printer 70 installed in "Store B", at a time earlier than the scheduled visit time "15:00" to visit the visit destination "AA Trading Co., A2 Branch" (for example, 14:30). When the user Z inputs the reservation number "123456" to the printer 70 installed in "Store B", the printer 70 prints the target print data of "document G". After the printing, the printer 70 deletes the target print data of "document G" which has been printed, from the printer 70, and transmits information indicating that "document G" has been printed, to the printing management apparatus 10.

If whether or not the visit schedule is to be changed is to be confirmed (YES in step S44), the change-confirmation transmitting/receiving unit 24 transmits change confirmation information for confirming whether or not the visit schedule is to be changed, to the terminal apparatuses 60 of the users Y and Z (in step S46). For example, when the user Z is going to change his/her schedule, the user Z uses his/her terminal apparatus 60 to change the scheduled visit time (in step S47). For example, as illustrated in FIG. 8B, the user Z changes the scheduled visit time to visit "AA Trading Co., A2 Branch" from "15:00" to "13:00". The terminal apparatus 60 of the user Z transmits response information including the changed scheduled visit time to the printing management apparatus 10.

The change-confirmation transmitting/receiving unit 24 receives the response information from the terminal apparatus 60, and outputs the response information to the schedule changing unit 26. The schedule changing unit 26 changes the scheduled visit time included in the schedule information in accordance with the changed scheduled visit time included in the response information (in step S48). For example, as illustrated in FIG. 8B, the schedule changing unit 26 changes the scheduled visit time for the user Z to visit "AA Trading Co., A2 Branch" from "15:00" to "13:00".

When change of a scheduled visit time causes multiple visit schedules (visit destinations, printing locations, and scheduled visit times) to overlap each other, the pieces of target print data corresponding to the visit schedules fail to be differentiated from each other, and the printing timings of the pieces of target print data overlap each other. For example, as illustrated in FIG. 8B, when the scheduled visit time for the user Z to visit "AA Trading Co., A2 Branch" is changed to "13:00", the schedules of the users Y and Z (visit destinations, printing locations, and scheduled visit times) are the same, and the printing timings of "document F" and "document G" overlap each other.

In the third example, if multiple visit schedules (visit destinations, printing locations, and scheduled visit times) overlap each other (YES in step S49), the schedule changing unit 26 issues a temporary number to differentiate the visit schedules (in step S50). For example, the schedule changing unit 26 associates the target print data associated with the changed scheduled visit time, with a temporary number. In the example in FIG. 8B, the schedule changing unit 26 associates the target print data of "document G" with a temporary number "987654". The printing management apparatus 10 transmits the temporary number to the terminal apparatus 60 of the user Z. Examples of the case in which scheduled visit times "overlap" each other include a case in which the scheduled visit times associated with pieces of target print data are the same, and a case in which the difference between scheduled visit times associated with pieces of target print data falls within a predetermined range. Therefore, the schedule changing unit 26 may issue a temporary number, not only in the case where the scheduled visit times associated with pieces of target print data are the same, but also in the case where the difference between scheduled visit times associated with pieces of target print data falls within a predetermined range.

In accordance with the scheduled visit time included in the schedule information, the print-information transmitting unit 18 transmits the print information to the printer 70 installed in the corresponding printing location (in step S51). In the example in FIG. 8B, the print-information transmitting unit 18 transmits the pieces of target print data of "document F" and "document G" to the printer 70 installed in "Store B", at a time earlier than the scheduled visit time "13:00" to visit the visit destination "AA Trading Co., A2 Branch" (for example, 12:30).

When the user Y arrives at "Store B" and inputs the reservation number "123456" to the printer 70 installed in "Store B", the printer 70 prints the target print data of "document F" which is not given a temporary number. After the printing, the printer 70 deletes the target print data of "document F" which has been printed, from the printer 70, and transmits information indicating that "document F" has been printed, to the printing management apparatus 10.

When the user Z arrives at "Store B" and inputs the temporary number "987654" to the printer 70 installed in "Store B", the printer 70 prints the target print data of "document G" which is given the temporary number. After the printing, the printer 70 deletes the target print data of "document G" which has been printed, from the printer 70, and transmits information indicating that "document G" has been printed, to the printing management apparatus 10.

In step S49, if the multiple visit schedules do not overlap each other (NO in step S49), the print-information transmitting unit 18 transmits print information in accordance with the scheduled visit time included in the schedule information, to the printer 70 installed in the corresponding printing location (in step S45).

According to the third example, similarly to the first example, the printing schedule is changed in accordance with a user schedule, preventing or reducing a decrease in security of the target print data and in usability. Each of customers is given a reservation number, achieving easy management of the customers in comparison with a case in which each of pieces of target print data is given a reservation number, and reducing the user's time and effort required when printing is to be performed. In the case where each of pieces of target print data is given a reservation number, multiple reservation numbers are issued even to the same customer, and a user needs to differentiate and manage the reservation numbers. In contrast, each of customers is given a reservation number, whereby a user manages only the reservation number associated with the customer of the visit destination. When the user inputs the reservation number to the printer 70, the target print data associated with the customer is printed, reducing the user's time and effort. In the case where each of customers is given a reservation number, visit schedules may overlap each other, and the printing schedules of multiple pieces of target print data may overlap each other. In the third example, a temporary number which is given allows the pieces of target print data to be differentiated from each other and be printed.

Similarly to the first example, target print data which has not been printed even when the scheduled visit time comes may be deleted from the printer 70.

Modified Exemplary Embodiment

Figure 10:
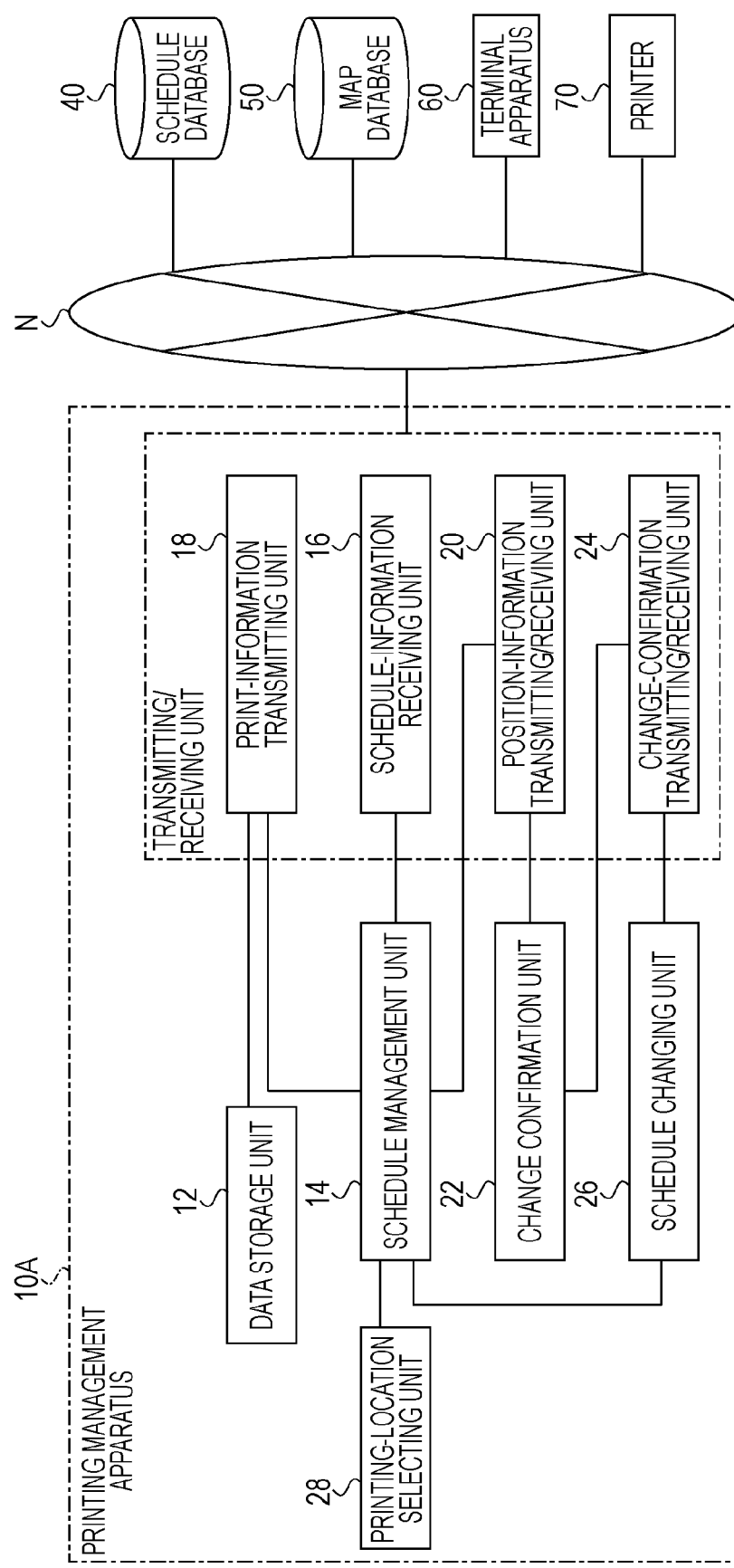
FIG. 10 is a block diagram illustrating an exemplary printing system according to a modified exemplary embodiment.

A modified exemplary embodiment will be described. FIG. 10 illustrates an exemplary printing system according to the modified exemplary embodiment. A printing management apparatus 10A according to the modified exemplary embodiment has the configuration of the printing management apparatus 10 illustrated in FIG. 1. In addition, the printing management apparatus 10A includes a printing-location selecting unit 28. The configuration of the printing management apparatus 10A excluding the printing-location selecting unit 28 is the same as that of the printing management apparatus 10. Most of the description below will be about the printing-location selecting unit 28.

The printing-location selecting unit 28 obtains a path from the current position of the terminal apparatus 60 to the visit destination on the basis of the current position of the terminal apparatus 60 and the position of the visit destination. The printing-location selecting unit 28 selects a printing location for the target print data associated with the visit destination on the basis of the positional relationship between the path and the printing locations. When the printing-location selecting unit 28 selects a printing location different from the printing location included in the schedule information, the printing-location selecting unit 28 changes the printing location included in the schedule information.

Figure 11:
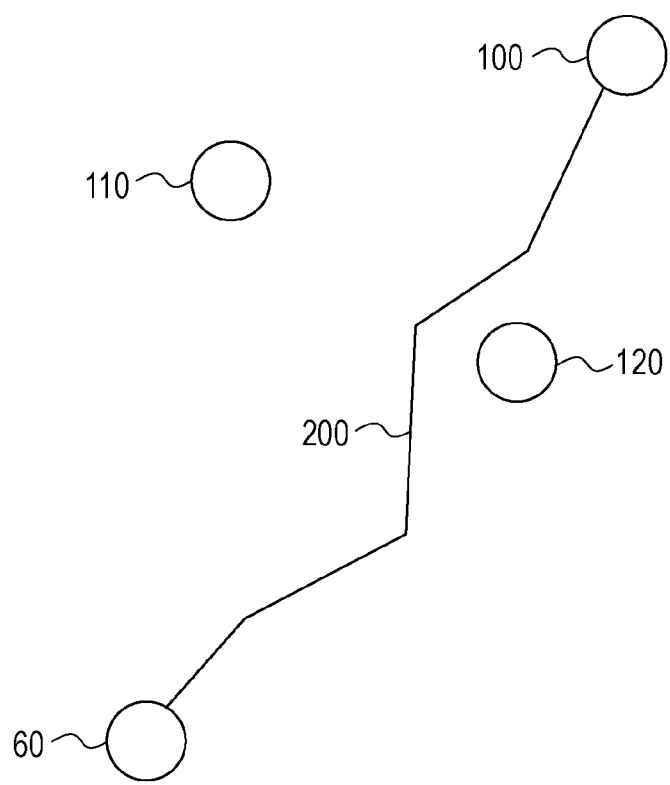
FIG. 11 is a schematic diagram illustrating an exemplary positional relationship between a terminal apparatus and a visit destination.

The process performed by the printing-location selecting unit 28 will be described by taking an example. For example, as illustrated in FIG. 11, a user carrying the terminal apparatus 60 is scheduled to visit a visit destination 100. A printing location 110 is a printing location included in the schedule information. That is, in the schedule illustrated in FIG. 2A and the like, the visit destination 100 is associated with the printing location 110. According to the schedule, the target print data is transmitted to the printer 70 installed in the printing location 110, at a time earlier than the scheduled visit time (for example, 30 minutes early), and enters the waiting state.

In the state illustrated in FIG. 11, the printing-location selecting unit 28 obtains a path 200 from the terminal apparatus 60 to the visit destination 100 on the basis of the position information of the terminal apparatus 60 and that of the visit destination 100. The printing-location selecting unit 28 obtains the distance (the straight-line distance or the distance along a path) between the path 200 and each of the printing locations, and selects a printing location from which the distance to the path 200 is the smallest. In this case, the printing management apparatus 10A transmits information including the position of the new printing location to the terminal apparatus 60. The position information of each of the printing locations is stored in advance in the printing management apparatus 10A. In the example in FIG. 11, the printing-location selecting unit 28 obtains the distance between the path 200 and each of printing locations 110 and 120. The distance between the path 200 and the printing location 120 is smaller than that between the path 200 and the printing location 110. Therefore, the printing-location selecting unit 28 selects the printing location 120 as a new printing location, and changes the printing location included in the schedule information from the printing location 110 to the printing location 120. The printing management apparatus 10A transmits information including the position of the new printing location 120 to the terminal apparatus 60. The printing management apparatus 10A transmits the target print data to the printer 70 installed in the printing location 120, at a time earlier than the scheduled visit time to visit the visit destination 100 (for example, 30 minutes early). When a user inputs a reservation number to the printer 70 installed in the printing location 120, printing is performed.

As described above, a path from the terminal apparatus 60 to the visit destination is obtained, and the printing location closest to the path is selected, whereby the travel distance of the user is reduced, improving usability. Even when the path which is initially scheduled is changed by changing the visit schedule, the printing location closest to the changed path is selected, preventing or reducing a decrease in usability.

The printing-location selecting unit 28 may select a printer 70 in accordance with the operation state of the printer 70 installed in each of the printing locations, and may change the printing location included in the schedule information. For example, the printing-location selecting unit 28 calculates a time period (predicted printing time period) required to complete the printing on the basis of the specification of the printer 70 and printing conditions of the target print data. Alternatively, the printing-location selecting unit 28 may calculate a predicted printing time period on the basis of the operation state of the printer 70 and the printing conditions of the target print data. Examples of a printing condition include the number of sheets to be printed, the data capacity, and the color condition (color printing or monochrome printing). Information concerning the specification of each of printers 70 is stored in the printing management apparatus 10A. The printing management apparatus 10A obtains information concerning the operation state from each of the printers 70. The printing-location selecting unit 28 selects a printer 70 (printing location) which completes printing of the target print data first in the case where the target print data is printed. At that time, the printing-location selecting unit 28 calculates a time period (predicted travel time period) required to travel from each of the printing locations to the visit destination, on the basis of the positional relationship between the visit destination and the printing location, and selects a printing location (printer 70) so that, after the printing, a user will arrive at the visit destination in time for the scheduled visit. For example, the printing-location selecting unit 28 calculates a printing completion time on the basis of the predicted printing time period, and selects a printing location on the basis of the printing completion time and the predicted travel time period so that, after the printing, a user will arrive at the visit destination in time for the scheduled visit. The printing-location selecting unit 28 may calculate a predicted travel time period on the basis of the standard traveling speed according to transportation, such as on foot or by car. When the printing-location selecting unit 28 selects a printing location different from one included in the schedule information, the printing-location selecting unit 28 changes the printing location included in the schedule information. The printing management apparatus 10A transmits information including the position of the new printing location, to the terminal apparatus 60.

As described above, taking a predicted printing time period into account may cause efficiency in the printing of target print data to be improved. A waiting time of a user at a printing location may be reduced, improving usability.

In the exemplary embodiment and the modified exemplary embodiment which are described above, the printing management apparatuses 10 and 10A may change the timing at which target print data is transmitted to the printer 70 at a printing location, in accordance with the positional relationship between the printing location and the visit destination. For example, the printing management apparatuses 10 and 10A may transmit target print data to the printer 70 at a time much earlier than the scheduled visit time as the distance between the printing location and the visit destination is longer. The longer the distance between the printing location and the visit destination is, the longer the time period required to arrive at the visit destination from the printing location is. Therefore, the target print data is transmitted to the printing location at a much earlier time, whereby a user may visit the visit destination at the scheduled visit time after printing is performed at the printing location.

The above-described printing management apparatuses 10 and 10A are achieved, for example, through cooperation of hardware resources and software. Specifically, the printing management apparatuses 10 and 10A include a processor (not illustrated) such as a central processing unit (CPU). The processor reads out programs stored in a storage (not illustrated) and executes them, achieving the functions of the schedule management unit 14, the schedule-information receiving unit 16, the print-information transmitting unit 18, the position-information transmitting/receiving unit 20, the change confirmation unit 22, the change-confirmation transmitting/receiving unit 24, the schedule changing unit 26, and the printing-location selecting unit 28. The above-described programs are stored in the storage via a recording medium, such as a compact disc (CD) or a digital versatile disc (DVD), or via a communication unit such as a network.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A printing management apparatus comprising:
   a storage unit configured to store schedule information including a correspondence among a visit schedule for a user to visit a visit destination, a printing schedule of target print data associated with the visit destination, and a printing location for the target print data; and
   a processor configured to:
   confirm whether or not the visit schedule is to be changed, in accordance with a positional relationship between the visit destination and a user;
   when the visit schedule is changed, change the printing schedule in accordance with the change;
   cause the target print data to be printed by using a printer installed in the printing location, in accordance with the printing schedule; and
   when the change of the visit schedule causes a plurality of visit schedules to overlap each other and causes printing locations for pieces of target print data associated with the plurality of visit schedules to match each other, transmit information for starting printing the pieces of target print data, to the terminal apparatus of the user who has changed the visit schedule, in such a manner that the pieces of target print data are differentiated from each other, each of the pieces of target print data being associated with a corresponding one of the plurality of visit schedules, the plurality of visit schedules being schedules for visiting an identical visit destination.

2. The printing management apparatus according to claim 1,
   wherein the schedule information includes a correspondence among the visit schedule for the user to visit each of a plurality of visit destinations, the printing schedule of the target print data associated with each of the plurality of visit destinations, and the printing location of the target print data associated with each of the plurality of visit destinations, and
   wherein the processor confirms whether or not the visit schedule is to be changed, in accordance with the positional relationship between the user and a visit destination candidate and other visit destinations among the plurality of visit destinations, the visit destination candidate being a visit destination to be visited next, the other visit destinations being destinations which have not been visited.

3. The printing management apparatus according to claim 2,
   wherein the processor confirms whether or not the visit schedule is to be changed, when the user is closer to a visit destination among the other visit destinations than the visit destination candidate, the other visit destinations being destinations which have not been visited.

4. The printing management apparatus according to claim 1, the processor further configured to:
   select a printing location for the target print data associated with the visit destination candidate, in accordance with the positional relationship between a path from a position of the user to the visit destination candidate and each of the printing locations.

5. The printing management apparatus according to claim 1, the processor further configured to:
   select a printing location for the target print data associated with the visit destination candidate, in accordance with an operation state of the printer at each of the printing locations.

6. The printing management apparatus according to claim 3, the processor further configured to:
   select a printing location for the target print data associated with the visit destination candidate, in accordance with the positional relationship between a path from a position of the user to the visit destination candidate and each of the printing locations.

7. The printing management apparatus according to claim 3, the processor further configured to:
   select a printing location for the target print data associated with the visit destination candidate, in accordance with an operation state of the printer at each of the printing locations.

8. A non-transitory computer readable medium storing a program causing a computer to execute a process for managing printing, the process comprising:
   storing schedule information including a correspondence among a visit schedule for a user to visit a visit destination, a printing schedule of target print data associated with the visit destination, and a printing location for the target print data;
   confirming whether or not the visit schedule is to be changed, in accordance with a positional relationship between the visit destination in the schedule information and a current position of the user;
   when the visit schedule is changed, changing the printing schedule in accordance with the change; and
   printing the target print data by using a printer installed in the printing location, in accordance with the printing schedule,
   when the change of the visit schedule causes a plurality of visit schedules to overlap each other and causes printing locations for pieces of target print data associated with the plurality of visit schedules to match each other, transmitting information for starting printing the pieces of target print data, to the terminal apparatus of the user who has changed the visit schedule, in such a manner that the pieces of target print data are differentiated from each other, each of the pieces of target print data being associated with a corresponding one of the plurality of visit schedules, the plurality of visit schedules being schedules for visiting an identical visit destination.

9. A printing management method comprising:
   storing schedule information including a correspondence among a visit schedule for a user to visit a visit destination, a printing schedule of target print data associated with the visit destination, and a printing location for the target print data;
   confirming whether or not the visit schedule is to be changed, in accordance with a positional relationship between the visit destination in the schedule information and a current position of the user;
   when the visit schedule is changed, changing the printing schedule in accordance with the change; and
   printing the target print data by using a printer installed in the printing location, in accordance with the printing schedule,
   when the change of the visit schedule causes a plurality of visit schedules to overlap each other and causes printing locations for pieces of target print data associated with the plurality of visit schedules to match each other, transmitting information for starting printing the pieces of target print data, to the terminal apparatus of the user who has changed the visit schedule, in such a manner that the pieces of target print data are differentiated from each other, each of the pieces of target print data being associated with a corresponding one of the plurality of visit schedules, the plurality of visit schedules being schedules for visiting an identical visit destination.

* * * * *